(12) United States Patent
Pairaktaridis (10) Patent No.: US 8,251,674 B1
(45) Date of Patent: Aug. 28, 2012

(54) BRUSHLESS COOLING FAN

(76) Inventor: John Pairaktaridis, Bayside, NY (US)

( * ) Notice: Subject to any disclaimer, the term of this patent is extended or adjusted under 35 U.S.C. 154(b) by 0 days.

(21) Appl. No.: 13/244,975

(22) Filed: Sep. 26, 2011

Related U.S. Application Data (63) Continuation of application No. 13/100,437, filed on May 4, 2011.

(51) Int. Cl.
*F04B 35/04* (2006.01)
*H02K 9/06* (2006.01)

(52) U.S. Cl. .................. 417/354; 310/62; 310/67 R (58) Field of Classification Search .......... 417/353, 417/354; 310/58, 59, 62–64, 67 R
See application file for complete search history.

(56) References Cited

U.S. PATENT DOCUMENTS

| | | | |
|---|---|---|---|
| 2,454,852 A | 11/1948 | Warner | |
| 2,558,737 A | 7/1951 | Darnell | |
| 2,698,128 A * | 12/1954 | Ault et al. ............... | 417/353 |
| 3,222,953 A | 12/1965 | Benjamen | |
| 3,663,328 A | 5/1972 | Turoczi, Jr. et al. | |
| 4,124,001 A | 11/1978 | Samuel et al. | |
| 4,347,468 A | 8/1982 | Wilke | |
| 4,428,719 A | 1/1984 | Hayashibara et al. | |
| 4,563,622 A * | 1/1986 | Deavers et al. ......... | 318/400.26 |
| 4,685,513 A | 8/1987 | Longhouse et al. | |
| 4,962,734 A | 10/1990 | Jorgensen | |
| 5,217,353 A | 6/1993 | De Filippis | |
| 5,489,186 A | 2/1996 | Yapp et al. | |
| 5,591,008 A | 1/1997 | Wrobel et al. | |
| 5,755,557 A | 5/1998 | Alizadeh | |
| 5,944,497 A | 8/1999 | Kershaw et al. | |
| 5,947,189 A * | 9/1999 | Takeuchi et al. ............... | 165/51 |
| 6,208,052 B1 | 3/2001 | Kershaw et al. | |
| 6,600,249 B2 * | 7/2003 | Nelson et al. .................. | 310/91 |
| 6,661,134 B2 | 12/2003 | Sunaga et al. | |
| 6,682,320 B2 * | 1/2004 | Gold et al. .................... | 417/368 |
| 7,088,062 B2 | 8/2006 | Makaran | |
| 7,121,368 B2 | 10/2006 | Mackelvie | |
| 7,244,110 B2 | 7/2007 | Hong et al. | |
| 7,589,444 B2 | 9/2009 | Teshima et al. | |
| 2005/0186070 A1 | 8/2005 | Zeng et al. | |
| 2006/0257251 A1 | 11/2006 | Carlson et al. | |
| 2001/0119389 | 5/2010 | Lazebnik et al. | |

* cited by examiner

*Primary Examiner* — Charles Freay
(74) *Attorney, Agent, or Firm* — Goldstein Law Offices, P.C.

(57) ABSTRACT

A fan assembly with impeller and shroud for application in a vehicle cooling system. The fan is powered by an external rotor brushless direct current (BLDC) motor having an electronic controller positioned away from the BLDC on an outer shroud wall with a plurality of ducts drawing an airflow from a static lower pressure created by the impeller, the airflow streaming over a heat sink disposed on the controller, exiting through a shroud. The static lower pressure air is pulled by a centrifugal fan and skewed magnets inside the motor through a plurality of ducts in a shroud hub, cooling the BLDC, maintaining low resistance for high efficiency. The BLDC is integrated into the assembly, having a stator fixed in the shroud hub and a rotor directly fused to the impeller, the shroud and impeller forming the BLDC motor without a housing, allowing the motor to easily dissipate heat.

16 Claims, 9 Drawing Sheets

BRUSHLESS COOLING FAN

CROSS-REFERENCE TO RELATED APPLICATIONS

This application is a continuation application of the non-provisional utility patent application Ser. No. 13/100,437 filed in the United States Patent Office on May 4, 2011 and claims the priority thereof.

BACKGROUND OF THE INVENTION

The invention relates generally to a brushless cooling fan. More particularly, the invention relates to a high efficiency brushless motor cooling fan for an automotive application.

Internal combustion engines, automotive engines as a prime example, require cooling. Typical cooling systems involve pumping a coolant over the heat generating systems and pumping the heated fluid to a fan-cooled radiator to release the heat to the atmosphere. Typically, a cooling system uses a brushed direct current (DC) motor to power the system fan. However, brushed DC motors are inefficient and prone to mechanical failure. Brushless direct current (BLDC) motors overcome the lower efficiency, susceptibility to mechanical wear and consequent need for servicing, the characteristic limitations of brushed DC motors.

In a BLDC motor, an electronic controller replaces the brush and commutator assembly of the brushed DC motor, which continually switches the phase to the windings to keep the motor turning. BLDC motors have greater reliability, reduced noise, longer lifetime, more power, eliminate ionizing sparks from the commutator, and reduce electromagnetic interference (EMI), allowing for easier compliance with electromagnetic compatibility (EMC) requirements. Since most modern vehicles incorporate computer controls in engine management and other general vehicle operations, reducing EMI is important for the reliability of the overall vehicle.

Brushless motors are more desirable than a conventional brushed motor, but come at the cost of potentially less rugged and more complex and expensive control electronics. These control electronics are not well suited for functioning under the hood of an automobile, where high temperatures generated by the engine create a hostile environment for the complex and expensive electronics. The operating life of the electronics at high temperature is significantly reduced due to higher resistance levels. This limits the reliability of an electronic control system, and consequently, the BLDC motor in high temperature environments. The higher cost, increased complexity and limited reliability at high temperatures have curtailed the adaptation of BLDC components in under-the-hood automotive applications. Modern automobiles with more powerful engines paradoxically need both an efficient, powerful, and reliable cooling system and generate relatively high temperatures hostile to BLDC electronic control systems. Under the hood, automotive components can reach temperatures greater than 100° C., the boiling point of water. The fan assembly is mounted in close proximity to the heat exchanger or radiator, where temperatures approach 110° C. To increase efficiency and operating life, sufficient cooling of the fan motor and its electronic components is imperative.

Many have proposed various answers to improving the cooling system with a brushless motor. Kershaw et al. (U.S. Pat. No. 6,208,052) discloses a heat sink structure at the base of the motor with the shaft of the motor attaching to the heat sink. A control unit circuit board is between the heat sink and a hub in the shroud base. Kershaw et al. (U.S. Pat. No. 5,944, 497) previously had proposed an opening in hub where the motor is cooled by air directed by a plate from the high pressure region of the fan to the low pressure region of the fan.

Sunaga et al. (U.S. Pat. No. 6,661,134) proposes a heat sink with supporting legs that are in contact with the electric circuit board so that the heat sink is positioned on the electric circuit board. The radiating fins of the heat sink are exposed to the outside through an opening in the circuit protection case adjacent to the motor. Takeuchi et al. (U.S. Pat. No. 5,947, 189) suggests a radiation fin unit of the control device inside the shroud that projects into an air guiding duct on the top of the controller. Nelson et al. (U.S. Pat. No. 6,600,249) proposes the controller of a brushless motor connecting to engine control mechanism and mounted to the side of the fan shroud in housing without any cooling mechanism.

In addition to the heat generated by the internal combustion engine, a BLDC motor generates heat internally. Although brushless motors typically operate cooler than conventional brushed motors due to the elimination of commutator-brush friction, common to both BLDC and conventional motors is the presence of copper magnet-wire coils found on the stator or armature. When electrical current passes through these coils, the electrical resistance within the copper magnet-wire produces heat. High temperatures increase electrical resistance, requiring more electricity to generate the same magnetic field and producing even more heat, creating the potential for thermal runaway, leading to burnout of the coils and destruction of the motor and other critical components.

Many have suggested ways to cool a fan motor itself. Hong et al. (U.S. Pat. No. 7,244,110) proposed a fan with a specially designed hub, the inside of the hub having vanes that become a radial-flow blower drawing cooling air through a brushed motor, not a BLDC motor. Yapp et al. (U.S. Pat. No. 5,489, 186) proposes stationary flow control vanes that attach to the housing, moving and recirculating the airflow in a pathway between the fan and the housing. Hayashibara (U.S. Pat. No. 4,428,719) discloses a rotor of a BLDC motor fixed to a centrifugal fan while a stator is fixed to the scroll concentrically with the rotor, cooling the motor and eliminating the necessity for the motor housing. De Filippis (U.S. Pat. No. 5,217,353) suggests a BLDC motor having a casing with holes for taking in air from outside for ventilating the interior of the brushless motor and a rotary part with holes which act as outlet ducts for the internal ventilation air.

The marketplace demands that these axial fans that are used in automotive cooling systems be both efficient and compact to fit in the limited space under the hood. Many have proposed way to either increase the air flow or condense the space required for the fan assembly. Alizadeh (U.S. Pat. No. 5,755,557) suggests a hub portion with a set of blades extending to a circular support and a second set of blades extending radially outwardly from the support. Similarly, Jorgensen (U.S. Pat. No. 4,962,734) discloses a fan ring around the fan blades and an assembly around the ring bearing the weight of the fan. Longhouse et al. (U.S. Pat. No. 4,685,513) incorporates an enveloping shroud which is fixed to the radiator and which has integral bracket structure for supporting the fan motor centrally therein. Carlson et al. (U.S. Patent Application Publication 2006/0257251) also has a hub with radially extending fan blades to an annular shroud, and a second set of fan blades extending from the shroud. Zeng (U.S. Pat. No. 5,591,008) discloses a motor fastened to a shroud, and a fan fastened to the motor.

Besides the necessity of cooling the motor and the controller for efficient operation of the fan, the blades of the fan impeller must be balanced to reduce unwanted vibration in the rotating fan assembly. The ends of the impeller blades typically attach to a rotating rim which must be annularly balanced for smooth rotation without vibrating. Similarly, many have thought about balancing wheels or crankshafts on automobiles where wobble is undesirable. Turoczi (U.S. Pat. No. 3,663,328) discloses indicia cemented to a side wall of a tire for balancing. Benjamen (U.S. Pat. No. 5,591,008) describes adding plugs to a wheel to balance a tire as well as pockets on a vibration damper around the crankshaft. Warner (U.S. Pat. No. 2,454,852) discloses a fan on a rotary valve of the crankshaft having balancing holes drilled in rim. Darnell (U.S. Pat. No. 2,558,737) suggest balance weights added onto the surface of the rim of the fan, which would create turbulent air flow. Wrobel (U.S. Pat. No. 5,591,008) discloses a fan impeller with one or more guide rings provided with pockets or bores for weights.

A special challenge for an automobile owner who desires to switch to a BLDC fan as part of customizing the vehicle is finding a universal BLDC fan that will work in his or her vehicle. It is desirable to produce a BLDC that adapts to many different makes and models of cars by accepting a range of voltage inputs to the controller and can adjust the fan speed based on engine requirements. Mackelvie (U.S. Pat. No. 7,121,368) proposes to control the fan speed with some type of speed sensor and a potentiometer on the flap on an axle. Samuel et al. (U.S. Pat. No. 4,124,001) discloses a temperature sensing system to vary fan speed with a potentiometer. Makarana (U.S. Pat. No. 7,088,062) suggests a method using a pair of fans, the second fan controlled by a variable frequency pulse width modulated (PWM) control signal to meet cooling requirements of an engine. Wilke (U.S. Pat. No. 4,347,468) proposes an electronic variable speed automotive blower control system controlled by a potentiometer on the dashboard. Lazebnik et al. (U.S. Patent Application Publication 2010/0119389) suggests a modular brushless motor that may be reconfigured for different applications and power levels by varying the number blades on the fan and coils in the stator.

While these units may be suitable for the particular purpose employed, or for general use, they would not be as suitable for the purposes of the present invention as disclosed hereafter.

SUMMARY OF THE INVENTION

It is an object of the invention to produce a brushless motor cooling fan that has a rugged electronic controller resistant to a high temperature under an automobile hood. Accordingly, the invention is a brushless motor cooling fan having an electronic controller protected by a heat sink that transfers heat away from the electronic controller.

It is another object of the invention to produce a brushless motor cooling fan that protects an electronic controller on a brushless motor from heat generated in the brushless motor during operation. Accordingly, the invention is a brushless motor cooling fan with an electronic controller placed away from the brushless motor and the heat associated with the operation of the brushless motor, the electronic controller disposed on an outer wall of a fan shroud.

It is yet another object of the invention to produce a brushless motor cooling fan that cools an electronic controller module on a brushless motor with a cooling airflow. Accordingly, the invention is a brushless motor cooling fan with a plurality of air ducts through an electronic controller module, the air ducts drawing a cooling airflow from a static lower pressure of a rotating impeller, the airflow streaming through ducts over the heat sink, exiting through a duct in the fan shroud.

It is a further object of the invention to produce a brushless motor cooling fan with a high efficiency brushless direct current motor (BLDC). Accordingly, the invention is a brushless motor cooling fan with a plurality of air ducts through a BLDC, the air ducts drawing a cooling airflow from a static lower pressure of a rotating impeller through a plurality of ducts in a shroud hub, cooling the BLDC, keeping the resistance low for high efficiency.

It is yet a further object of the invention to produce a brushless motor cooling fan with a rugged brushless direct current (BLDC) motor that has a rotor that is cooled by air. Accordingly, the invention is a brushless motor cooling fan with a BLDC motor with a centrifugal fan and a plurality of skewed magnets inside the motor, drawing cooling air through the BLDC and cooling the BLDC, improving the efficiency, durability and ruggedness by lowering the temperature of BLDC during operation.

It is a still further object of the invention to produce a brushless motor cooling fan with an integrated brushless direct current motor (BLDC) that dissipates heats to the surroundings. Accordingly, the invention is a brushless motor cooling fan with an external rotor BLDC motor having an outer rotor rotating around a stator, the stator fixed in a shroud hub, the rotor directly fused to an impeller fan without a housing, the stator in the shroud hub and the external rotor with the impeller fan integrating to form the BLDC motor and the rotor dissipating heat directly to the surroundings.

The invention is a fan assembly with an impeller and shroud for application in a vehicle cooling system. The fan is powered by a high efficiency external rotor brushless direct current motor (BLDC) that has a rugged electronic controller positioned in a module away from the BLDC on an outer wall of the shroud with a plurality of air ducts drawing a cooling airflow from a static lower pressure created by the impeller, the airflow streaming over a heat sink disposed on the controller, exiting through a duct in the shroud. The static lower pressure air flow is pulled by a centrifugal fan and a plurality of skewed magnets inside the motor through a plurality of ducts in a shroud hub, cooling the BLDC, keeping the resistance low for high efficiency and reliability. The BLDC is integrated into the assembly, having a stator fixed in the shroud hub and an external rotor directly fused to the impeller, the shroud and impeller forming the BLDC motor without a housing, allowing the rotor and stator to easily dissipate heat directly to the surroundings.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 2:
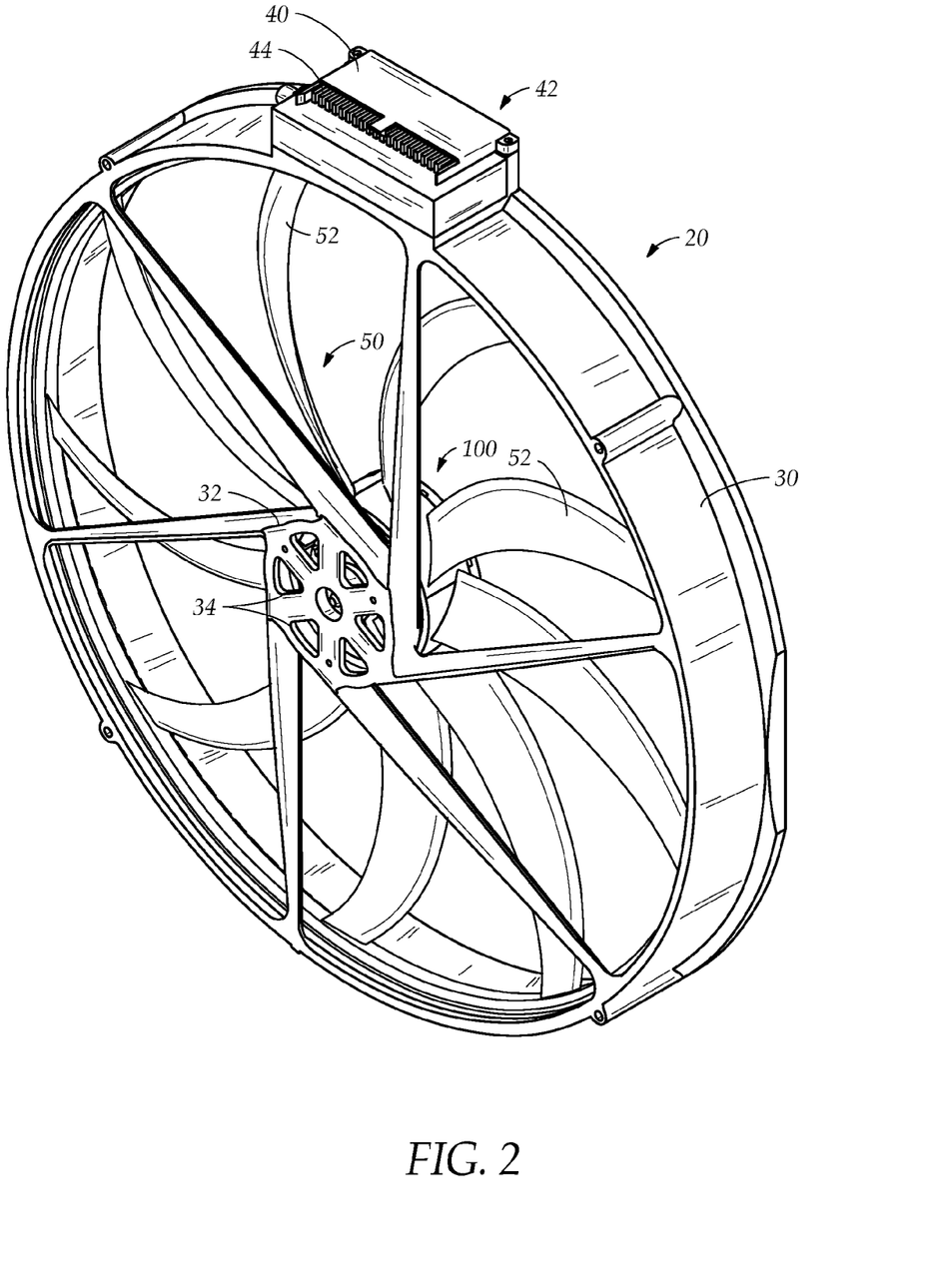
FIG. 2 is a diagrammatic perspective view of the brushless cooling fan from the front.

FIG. 2 illustrates a brushless cooling fan assembly 20 for application in an cooling system of a vehicle with an internal combustion engine. The fan assembly 20 is powered by a high efficiency external rotor brushless direct current (BLDC) motor 100. The form and construction of the fan assembly 20 allows for the efficient and reliable operation of a vehicle cooling system that eliminates the drawbacks of BLDC motors, especially operating in a high temperature environment found under a vehicle hood. This is accomplished by strategic positioning a plurality of critical components and integrating these components with a plurality of air ducts 42, 34 for forced air convection cooling as explained hereinbelow.

The fan assembly has the open architecture (BLDC) motor 100 with an electronic control module (ECM) 40, an axial fan impeller 50 and a fan shroud 30, each having an innovative structure that promotes cooling of critical electronic components. The cooling fan assembly 20 is uniquely fashioned to protect critical components such as the ECM 40 from high temperatures found under a hood of the vehicle. The axial fan impeller 50, having a plurality of blades 52, is the primary fan used to cool the vehicle engine. The electronic control module (ECM) 40 controls the BLDC motor 100, which in turn, rotates the axial fan impeller 50. The shroud 30 mounts the fan assembly 20 with the BLDC motor 100, ECM 40 and impeller 50 to the vehicle cooling system.

The shroud 30 having a central hub 32, is the assembly point for the impeller 50, the control module 40 and the BLDC 100. The shroud 30 also helps with directing cooling air from the axial fan impeller 50 through the control module 40 and through the hub 32 to cool the BLDC 100. The shroud 30 has a circumferential outer wall 36 with a base plate 38 mounted on the outer wall 36, outside the shroud 30. The ECM 40 mounts on the base plate 38 in a novel position, away from the BLDC motor 100, on the cooler outer wall 36 of the shroud 30 in a pathway of cooling air described hereinbelow.

All BLDC motors require an electronic controller for operation to continually switch the phase of a plurality of winding inside the motor to keep the motor turning. The controller performs timed power distribution by using a solid-state circuit. The principals of how a BLDC motor is controlled by an electronic controller are well known to those of ordinary skill and are beyond the scope of this discussion. Because the operating life of the electronics is significantly reduced due to higher resistance levels at high temperature, cooling the electronic controller is critical to the operation of the cooling fan assembly 20. The invention cools the electronic controller using three different techniques, namely, by distancing the ECM 40 from the motor 100, by providing a heat sink 44 and providing the duct 42 for a cooling air flow.

Figure 7:
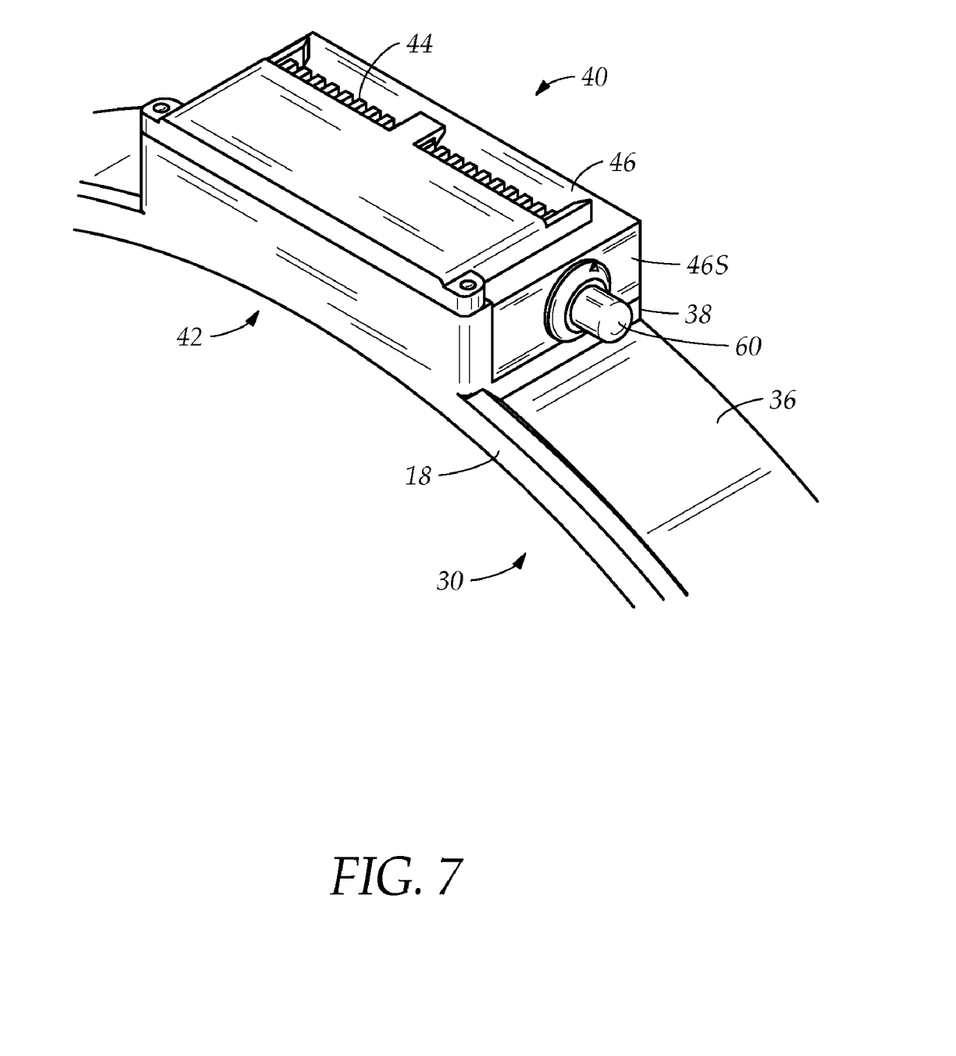
FIG. 7 is a diagrammatic perspective view of the ECM from the top of the shroud.

FIG. 7 shows the novel position of the ECM 40 on the outer wall 36 of the shroud 30. The shroud has an outer rear flanged edge 38. The ECM 40 is placed on the edge 38 of the shroud 30 on the flat base plate 38. The ECM 40 includes a housing 46 containing the BLDC motor electronic controller, a fan switch connecting to a vehicle control system and at least one connector, wired to the BLDC motor. The ECM 40 also includes the heat sink 44 to dissipate heat by transferring the heat to surrounding air and a potentiometer 60. By separating the BLDC motor and the electronic controller, the heat generated by the motor does not transfer over to the controller, thereby reducing the operating temperature of the controller and extending its operation.

Figure 4:
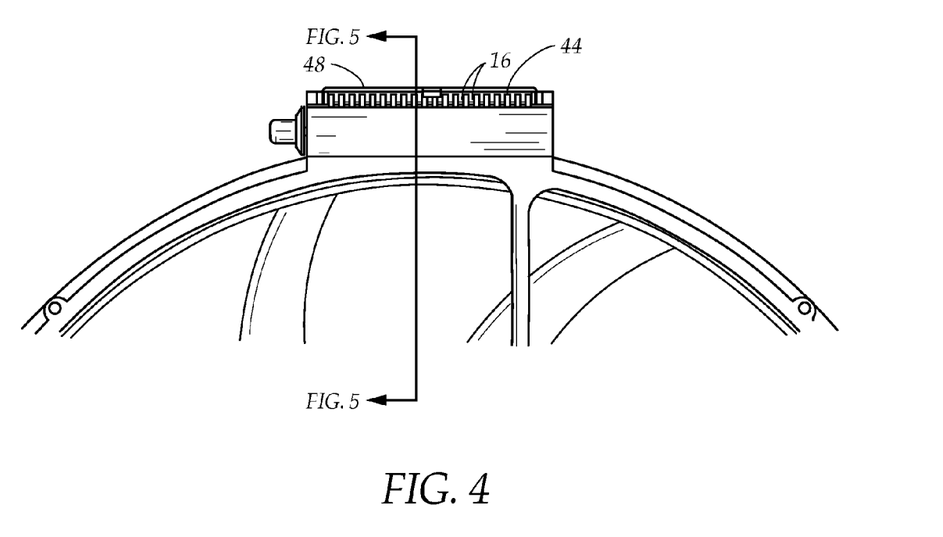
FIG. 4 is a front elevational view of an electronic controller module (ECM) mounted on a fan shroud of the brushless cooling fan.

The heat sink 44 is mated to a plurality of high temperature integrated circuits of the controller in the housing. FIG. 4 shows the heat sink 44 having a plurality of fins 16 with a saw-tooth shaped top surface and sitting on the housing 46 containing the electronic circuits. The heat sink is held in place by a clip 48. The heat sink 44 is cooled by focused convection cooling explained hereinbelow.

Figure 5:
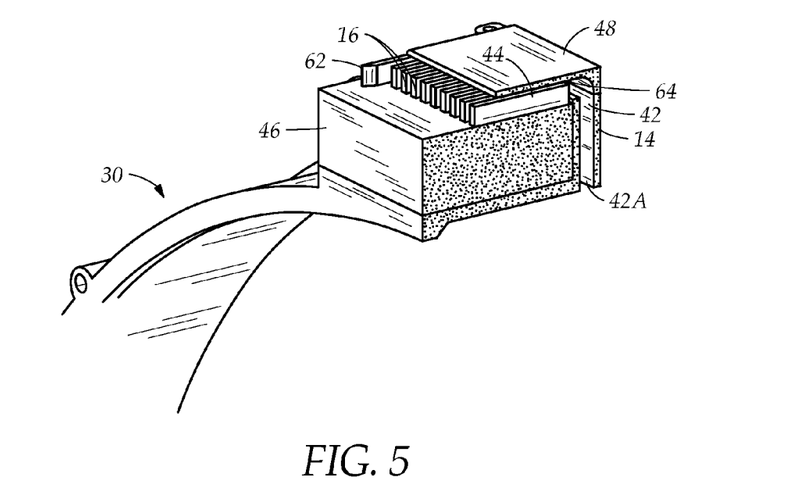
FIG. 5 is a cross-sectional view of the ECM mounted on the fan shroud from the front.
Figure 6:
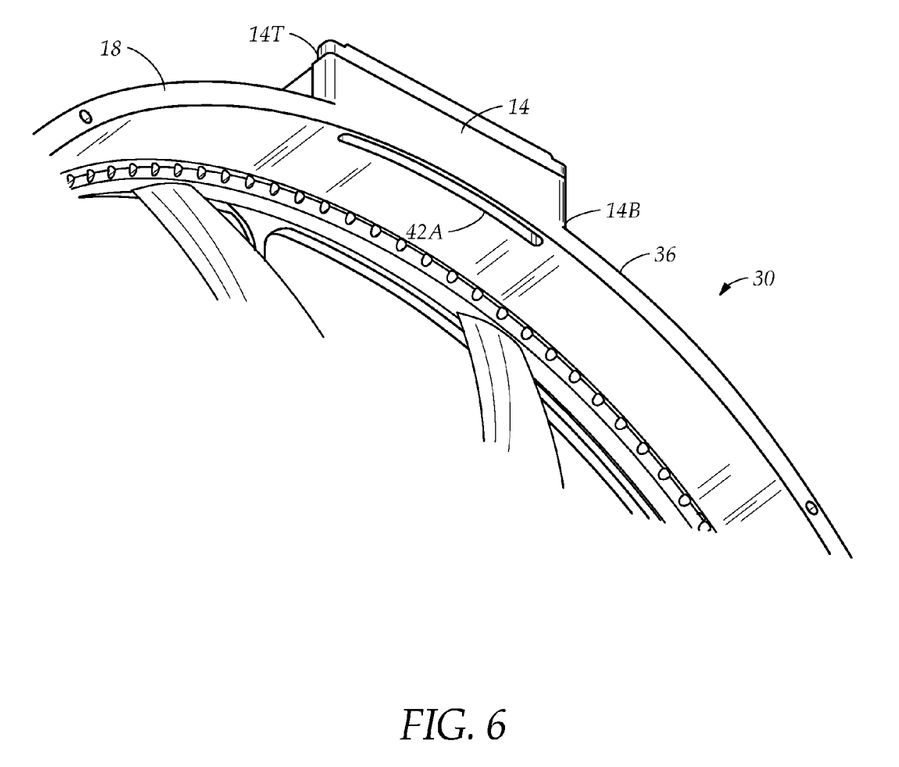
FIG. 6 is a diagrammatic perspective view of an impeller rim, the shroud with the ECM mounted from below.
Figure 10:
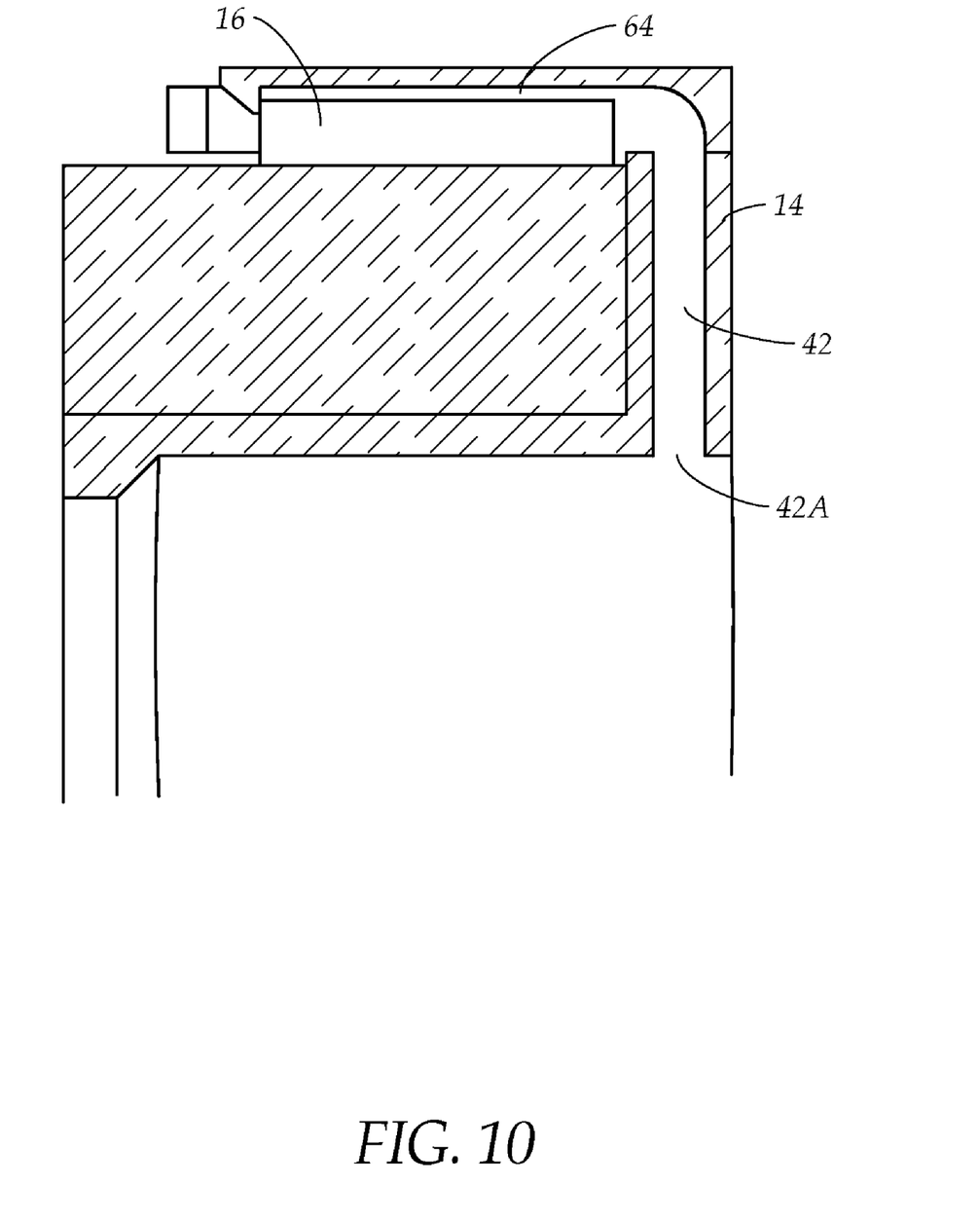
FIG. 10 is a cross-section elevational view of the ECM showing a cooling airflow pathway through the ECM.

Cooling the ECM 40 is further accomplished by air convection cooling through a plurality of ducts. The focused convection cooling ducts (FCCD) further decreases operating temperature. As shown in FIG. 6, on the edge of the outer wall 36 of the shroud 30 is the duct behind the ECM base plate, formed by a sidewall 14 attached orthogonally to the edge 18 of the outer wall 36 of the shroud 30. The sidewall has a top 14T and a bottom 14B, the bottom 14B attaching to the edge 18 of the shroud 30. The bottom 14B of the sidewall 14 has a duct opening 42A creating an air exit adjacent to the sidewall. Referring to FIG. 5, the drawing in cross section shows the clip 48 attaching to the top of the sidewall 14 and extending substantially above and over the fins 16 of the heat sink 44, the clip 48 have a plurality of fasteners 62 attaching to the housing 46. Between the top surface of the fins 16 of the heat sink 44 and the clip 48 are air ducts 64 created by a gap between saw-tooth surface of the fins 16 and the clip 46. Air flows past the heat sink 44 through the ducts 64 into the duct 42 adjacent to the sidewall 14 and out the air exit 42A in the shroud 30, the air entering the ducts 64 from the furthest away from the vehicle's heat source. As a result, air that is focused past the heat sink fins 16 will be cooler and allow the controller to operate at lower temperatures. FIG. 10 shows the path of the air flow starting above the fins 16 and flowing down the duct 42 at the sidewall 13 and out the exit 42A. Air flow through the ducts 64, 42 is facilitated by the static pressure created by the cooling fan during operation. Theses three different techniques, namely, by distancing the ECM from the motor, by providing the heat sink and providing the ducts for a cooling air flow effectively cools the electronic controller for efficient and reliable operation. In addition, situating the ECM in this manner reduces obstructions that potentially create turbulent flow and further reduces the air flow consumed in cooling the ECM.

Figure 8A:
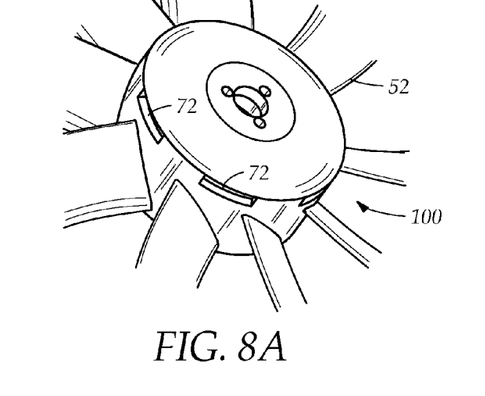
FIG. 8A is a diagrammatic perspective view of a brushless direct current (BLDC) motor from the rear.
Figure 8B:
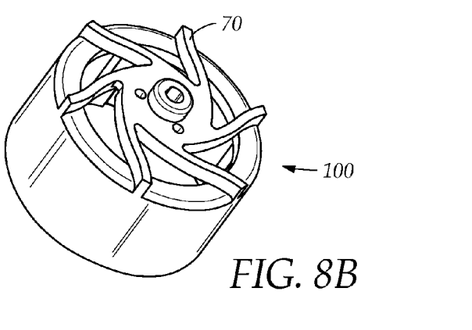
FIG. 8B is a diagrammatic perspective view, similar to FIG. 8A, of the BLDC motor from the front.
Figure 8C:
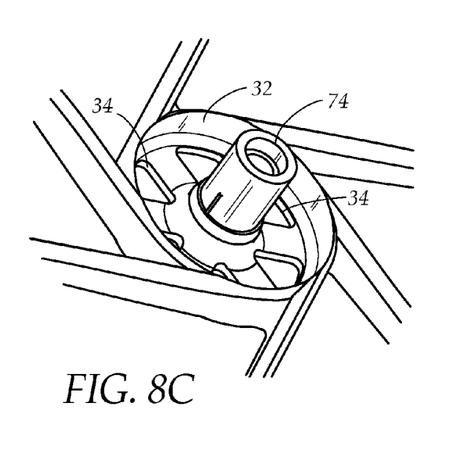
FIG. 8C is a diagrammatic perspective view of a hub and a core on the shroud from the rear.
Figure 8D:
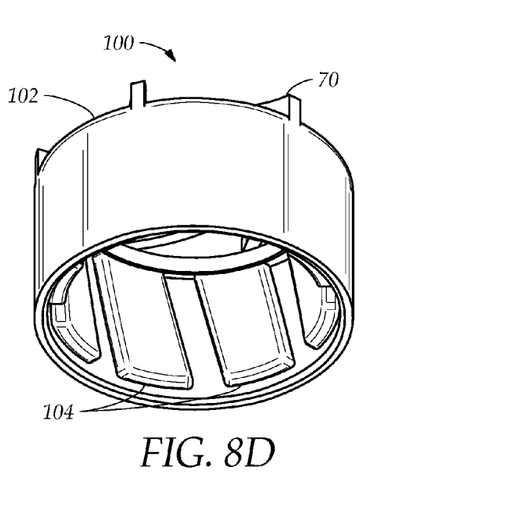
FIG. 8D is a diagrammatic perspective view of a rotor and a plurality of skewed magnets inside the rotor.

High temperatures effect the performance of the BLDC motor, the high temperatures created both by the vehicle's engine as well as by the BDLC motor itself. High temperatures negatively effect the efficiency and durability of the motor. The invention cools the motor by having a plurality of air ducts for cooling airflow, by having a centrifugal fan and a plurality of skewed magnets inside the motor and having an open architecture external rotor directly attaching to the impeller, allowing heat to dissipate. As shown in FIG. 8C, the shroud has the center hub with a hollow center core having a bore. In the center hub of the shroud is a plurality of cooling ducts. FIG. 8B shows a small centrifugal fan 70 located between the motor 100 and the axial impeller blades 52, shown in FIG. 8A, dissipates heat from the BLDC motor 100 by focused convection air flow through the motor. The centrifugal fan 70 draws cooler air in from the front of the motor and exits through a plurality of outlets 72 on the motor, shown in FIG. 8A. Air then passes through the BLDC motor effectively cooling the BLDC motor. The centrifugal fan and the plurality of skewed magnets rotates during operation drawing air through the cooling ducts 34 in the shroud hub 32 shown in FIG. 8C. In addition, lower static air pressure is created by the axial impeller blades during operation that promotes the flow of air through the BLDC motor. The BLDC motor, having an open center, attaches to the hub 32 having a core 74, the core fitting into the center of the motor. FIG. 8D shows the skewed magnets 104 inside the flux ring 102 of the BLDC 100, the centrifugal fan 70 drawing air through the skewed magnets to cool the motor.

Figure 1:
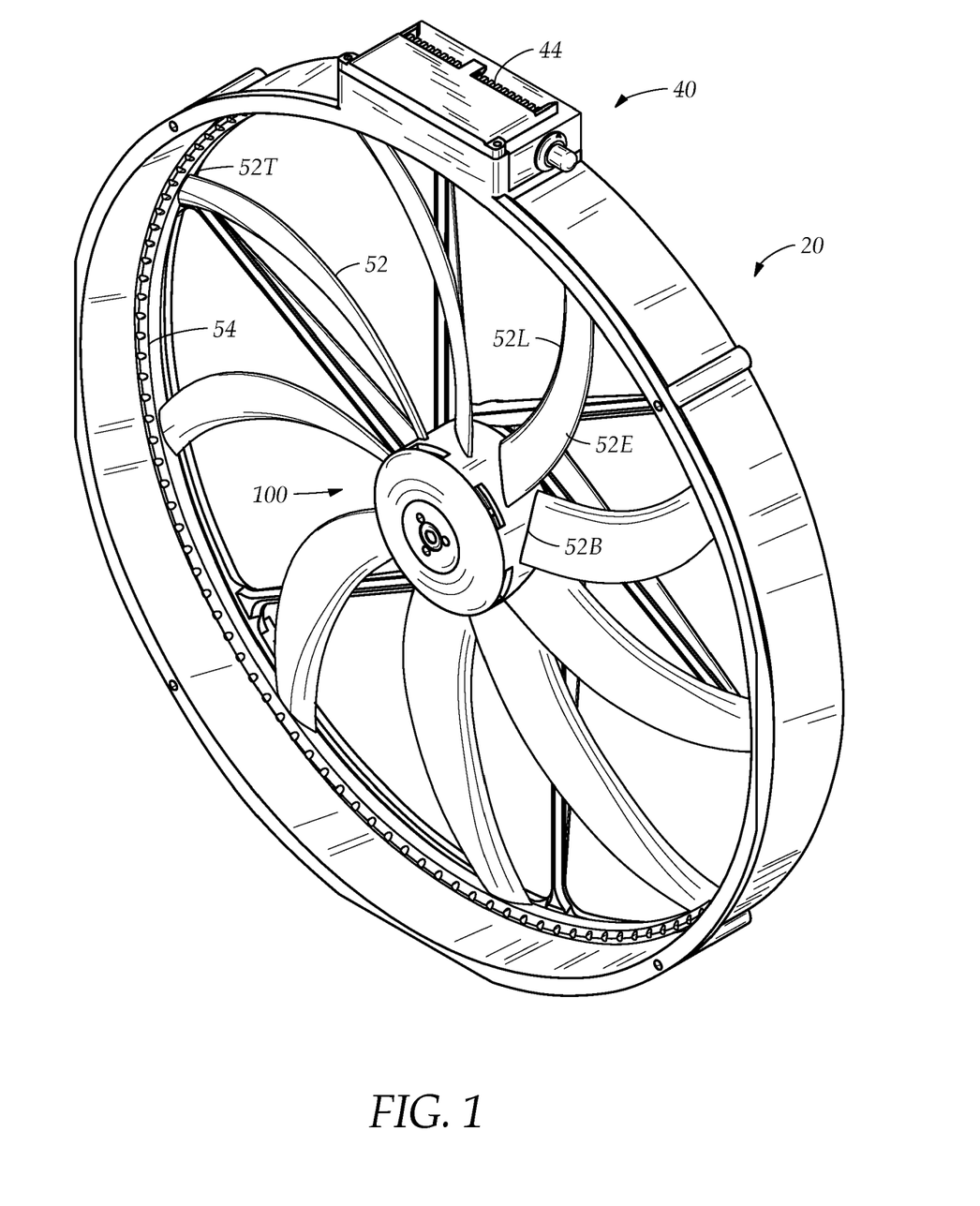
FIG. 1 is a diagrammatic perspective view of a brushless cooling fan from the rear.

FIG. 1 shows the brushless cooling fan assembly 20 from the rear. The axial impeller blades, each having a top 52T and a bottom 52B radially extend from the BLDC motor 100 to an annular rim 54, the bottom fixed to the motor 100 the top fixed to the rim 54. The axial impeller blades 52 use airfoil design that has a round leading edge 52R, a sharp trailing edge 52E, and in profile or cross section, look similar to a teardrop that has been flattened on one side. As air approaches the blade's leading edge 52R, the stream splits and travels above and below the blade. Air is deflected across the convex curve along the top 52T of the blade 52 and along the flat or concave curve on the bottom 52B of the blade 52B, and flows downward over the sharp trailing edge 52E as it leaves the blade 52. The faster moving air across the top 52T of the blade creates less pressure than the slower moving air on the bottom of the blade. The twisted design of the blade ensures that the incident angle between the airfoil and the airflow is constant along the blade length, giving a uniform blade loading for high efficiency, low noise fans. At high static pressures, the blade twist is important, because without it, the inner portion of the blade 52 will stall and permit reversed airflow, which, will seriously reduce the fan efficiency. The high static pressure created by the airfoil design facilitate the air flow through the heat sink 44 of the ECM 40, cooling the ECM 40 which is critical to the operating efficiency and reliability of the brushless cooling fan assembly.

Figure 9:
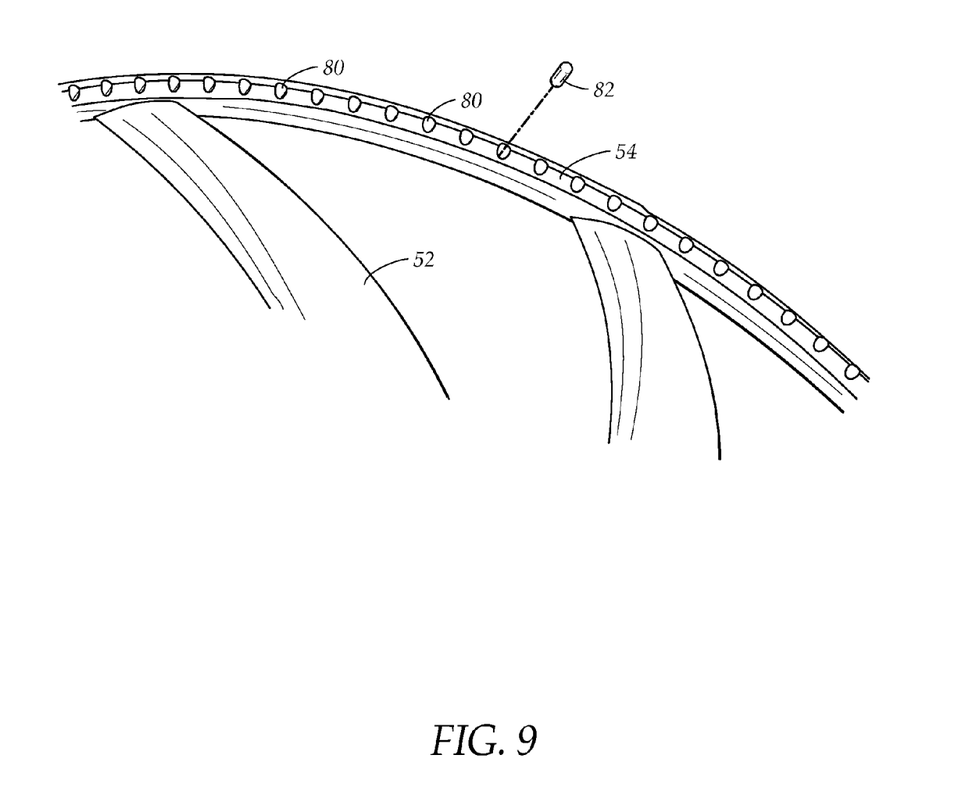
FIG. 9 is a diagrammatic perspective view of an inside rim of the impeller.

Referring to FIG. 9, when an odd number of blades 52 are provided in an impeller, it is necessary to balance the impeller. Placing weights directly on the blade 54 has undesirable side effects, such as creating turbulent air flow. In the present invention, a plurality of hollows 80 are drilled into the edge of the fan rim 54 located about three degrees apart. These hollows can be selectively filled with a small amount of tungsten or another dense, high temperature melting substance, preferably in the form of a small ball 82, as needed in order to precisely balance the fan, to create the high static pressure for air flow through the cooling ducts of the invention.

Referring again to FIG. 7, the ECM housing, having 46 a side 46S, has the potentiometer 60 attached to the side 46S of the housing 46. The potentiometer 60 is used in conjunction with a fan speed controller in the vehicle control system. This allows the fan speed to be adjusted to provide the desired cubic feet per minute airflow needed by the specific type of car into which it is installed. The potentiometer 60 is selectively adjustable to a range of voltages from the vehicle control system that are possible with various makes and models of automobiles that would be customized with an aftermarket brushless cooling fan.

Figure 3:
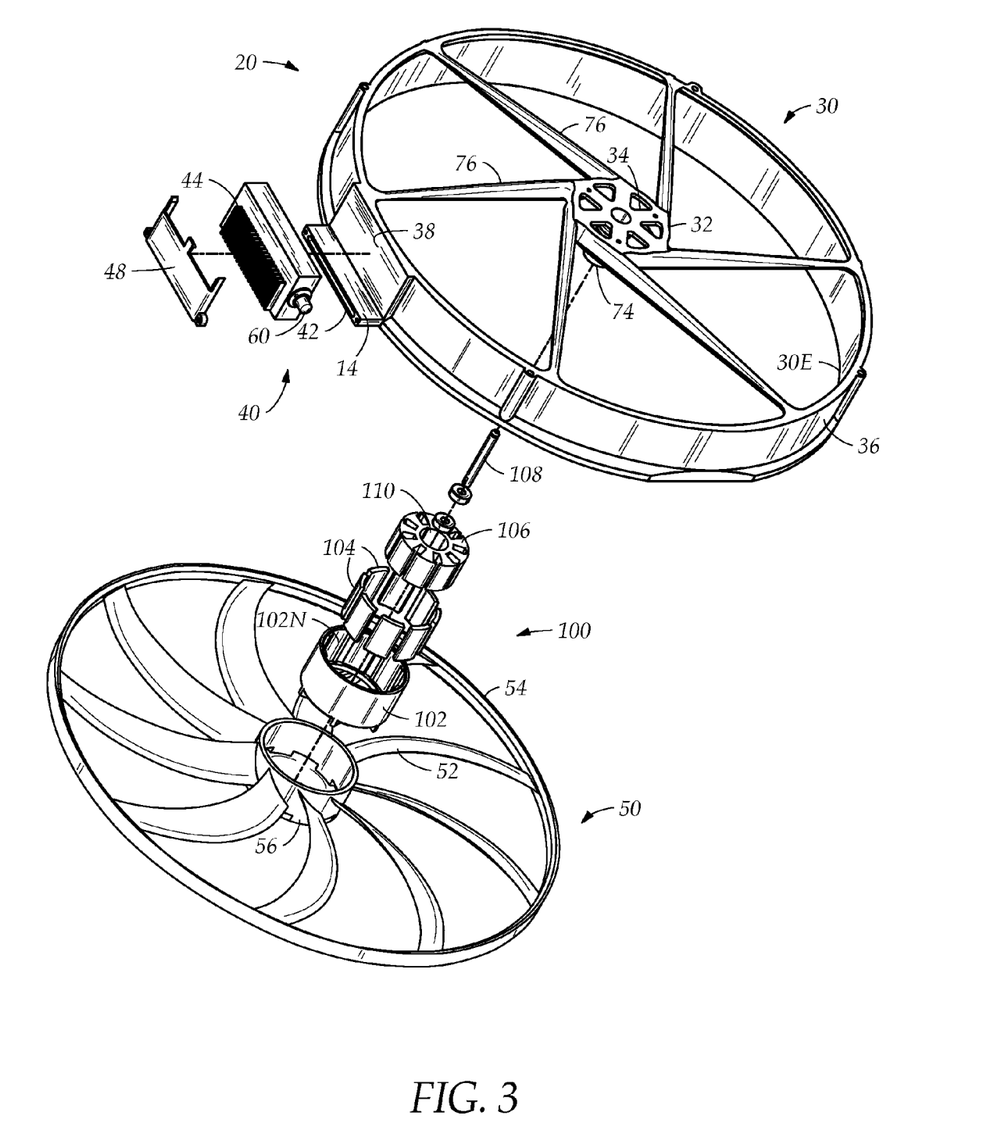
FIG. 3 is an exploded view of the brushless cooling fan from the front.

FIG. 3 shows the components of the brushless cooling fan assembly 20 in an exploded view. It is understood by those of ordinary skill that this representation shows different components separately for illustrative purposes. The axial fan impeller 50 has the outer rim 54, a center ring 56 and the axial impeller blades 52 radially disposed around the center ring connecting to the outer rim 54 in the airfoil design. In the outer rim 54 are the hollows for balancing the impeller 50 with weighted balls. The axial fan impeller 50 cools the vehicle engine, but the blade design and balance of the invention creates static pressure to direct cooling air into the ducts of the invention to cool the BLDC motor 100 and the electronic controller module 40. The center ring 56 is fused to the BLDC motor 100 and is part of the motor as explained hereinbelow.

The motor 100 of the invention is preferably an external rotor BLDC motor. The operation of an external rotor BLDC motor is well known to those of ordinary skill, the details of which are beyond the scope of this discussion except to how the operation of BLDC motor relates to features of the invention. In the external rotor BLDC motor the entire outer periphery of the motor rotates. The BLDC motor has a flux ring 102, the plurality of skewed magnets 104, a stator 106, and a shaft 108. The outer periphery is the flux ring 102, a ferrous cylinder used to contain the magnetic field of the skewed magnets 104 that rotates around the stator 106. The flux ring 102 has an inner wall 102N, the skewed magnets attaching to the inner wall. The stator 106 is stationary in the external rotor BLDC motor, the skewed magnets 104 and the flux ring 102 rotating around the stator 106. The stator 106 has a center bore 110 and mounts in the hub 74 of the shroud 32, the core of the hub 74 inserting through the center bore 110 of the stator 106. Inside the core 74 of the hub 32 is the shaft 108 running through dual bearings in the center of the BLDC motor 100 used to align the external rotor 102 to the stator 106.

The center ring 56 of the nonferrous axial fan impeller 50 adheres to the flux ring 102 and moves as one piece, the axial impeller center ring 56 and flux ring 100 are fused together using high temperature epoxy adhesive and positioning screws, assuring that the axial fan impeller 50 is permanently and uniformly attached to the flux ring 102. The axial impeller center ring 56 and the external brushless DC motor 100 are integral components to the efficient operation of the axial fan impeller 50. During operation, torque is evenly distributed to the impeller blades 52, creating the static pressure that creates air flow through the brushless cooling fan assembly 20. The centrifugal fan and the skewed magnets, which are not shown in this drawing, facilitate air flow through the motor 100 for cooling and sits inside the flux ring 102 and impeller ring 56, drawing in the cooling air created by the static pressure through the ducts.

The axial impeller center ring 56 bound to the flux ring 102 and stator 106 mounted in the hub 32 of the shroud 30 eliminates the necessity for a separate "can" or motor housing, the impeller and the shroud of the fan assembly integrating together to contain the external BLDC motor 100. In the external rotor BLDC motor 100, the internal components of the motor, the rotor including the flux ring 102 and the skewed magnets 104 are exposed to the outside air. This design facilitate convection cooling of the critical motor components. Cooling air enters the ducts 34 on the shroud hub 32, which is further from the vehicle engine heat source. Air flows through ducts 34, past the stator 106, between the stator 106 and the skewed magnets 104 and between each magnet 104, effectively cooling the stator 106 and the magnets 104. Air flow is boosted by the centrifugal fan and the skewed magnets in the motor and static pressure created by the axial fan impeller 50.

The shroud 30 has a front 30F, the front 30F has a plurality of support arms 76 radially extending out from the hub 32 and connecting to the outer wall 36 of the shroud 30. At least one connecting wire is inside a support arm 76, connecting the BLCD 100 motor to the electronic controller module 40. The base plate 38 for the ECM 40 mounts on the outer wall 36 of the shroud 30, with the attached sidewall 14 having the air duct 42 orthogonal to the base plate 38 and extending outwardly from the base plate 38. The ECM 40 with the heat sink 44 and potentiometer 60 mount on the base plate 38 and are held in place by the clip 48. Air flow created by the static pressure of the impeller 50 moves across the heat sink 44 and exits out the duct 42 as described hereinabove.

The components described hereinabove of the brushless cooling fan assembly 20 are integrated to maximize the cooling of the BLDC motor 100 and the electronic controller module 40. The airfoil design impeller blades 52, perfectly balanced by weights in the rim 56, create static pressure causing cool air to flow through the BLDC motor 100 and electronic controller module 40. The electronic controller module 40 is positioned at a maximum distance from heat of the BLDC motor 100. The BLDC motor 100 mounts on the shroud hub 32 that is integrated with the impeller 50 to allow the rotor which includes the flux ring 102, impeller center ring 56 and the skewed magnets 104, of the motor 100 to be exposed to the outside for additional cooling. The shroud hub 32 has cooling ducts 34 to assist the centrifugal fan and the skewed magnets inside flux ring 100 to pull cooling air in further cooling the motor 100, the cooling air flowing from the static pressure generated by the impeller 50 optimally designed and balanced as described hereinabove.

In conclusion, herein is presented a high efficiency brushless cooling fan for retrofitting on a high performance automotive engine. The invention is illustrated by example in the drawing figures, and throughout the written description. It should be understood that numerous variations are possible, while adhering to the inventive concept. Such variations are contemplated as being a part of the present invention.

What is claimed is:

1. A brushless cooling fan assembly for application in a vehicle cooling system, comprising:
   an axial fan impeller, the impeller having a center ring, an outer rim and a plurality of blades extending radially from the center ring to the outer rim;
   a shroud for mounting the fan assembly in the vehicle cooling system, the shroud having a center hub with a hollow core and an outer wall, the outer wall having a base plate mounted outside the outer wall;
   a brushless direct current (BLDC) motor with a center bore and a periphery, the periphery fused to the center ring of the impeller, the hollow core of the shroud inserted through the center bore of the motor, joining together the motor, the shroud and the impeller, the BLDC motor powering the impeller, creating heat;
   an electronic controller module, having a housing, the housing having an electronic controller electrically connected to the BLDC motor, for controlling the BLDC motor, the electronic controller module mounted on the base plate on the outer wall to separate the controller from the BLDC motor, for protecting the electronic controller from heat created by the BLDC motor;
   a heat sink disposed on the housing of the electronic controller, the heat sink mated to the electronic controller to dissipate the heat away from the electronic controller, the heat sink having a plurality of fins, the plurality of fins having a sawtooth surface; and
   a clip extending substantially above and over the fins of the heat sink, holding the heat sink on the housing and forming a plurality of ducts with the sawtooth surface of the fins.

2. The brushless cooling fan assembly as described in claim 1, wherein the outer wall of the shroud has a sidewall orthogonal to and extending outwardly from the base plate, the side wall having an air duct, the shroud outer wall having an exit opening connected to the duct, allowing cooling air to stream over the heat sink through the plurality of ducts into the air duct of the side wall and exiting out the opening in the shroud, transferring heat from the heat sink to the cooling air.

3. The brushless cooling fan assembly as described in claim 2, wherein the blades of the impeller have an airfoil design, the airfoil design creating a high static pressure that facilitates air flow through the heat sink of the electronic controller module.

4. The brushless cooling fan assembly as described in claim 3, wherein the BLDC motor has a centrifugal fan and a plurality of skewed magnets inside the periphery of the motor that rotates with the impeller to cool the motor while operating.

5. The brushless cooling fan assembly as described in claim 4, wherein the hub of the shroud has a plurality of ducts to allow air to be pulled into the motor by the centrifugal fan to cool the motor during operation.

6. The brushless cooling fan assembly as described in claim 5, wherein the BLDC motor is an external rotor BLDC motor, having a rotor on the periphery of the motor to transfer and dissipate heat away from the motor.

7. A brushless cooling fan assembly for aftermarket customization of a vehicle cooling system, comprising:
   an axial fan impeller, the impeller having a center ring, an outer rim and a plurality of blades extending radially from the center ring to the outer rim;
   a shroud for mounting the fan assembly in the vehicle cooling system, the shroud having a center hub with a hollow core and an outer wall, the outer wall having a base plate mounted outside the outer wall;
   a brushless direct current (BLDC) motor with a center bore and a periphery, the periphery fused to the center ring of the impeller, the hollow core of the shroud inserted through the center bore of the motor, joining together the motor, the shroud and the impeller, the BLDC motor rotating the impeller, creating heat;
   an electronic controller module, having a housing, the housing having an electronic controller electrically connected to the BLDC motor for controlling the BLDC motor, the module having a heat sink disposed on the housing, the heat sink having a plurality of fins with a sawtooth surface, the heat sink mated to the electronic controller to dissipate the heat away from the electronic controller, the electronic controller module mounted on the base plate on the outer wall to separate the controller from the BLDC motor, for protecting the electronic controller from heat created by the BLDC motor; and
   a clip extending substantially above and over the fins of the heat sink, holding the heat sink on the housing and forming a plurality of ducts with the sawtooth surface of the fins.

8. The brushless cooling fan assembly as described in claim 7, wherein the outer wall of the shroud has a sidewall orthogonal to and extending outwardly from the base plate, the side wall having an air duct, the shroud outer wall having an exit opening connected to the air duct, allowing cooling air to stream over the heat sink through the plurality of ducts into the air duct of the side wall and exiting out the opening in the shroud, transferring heat from the heat sink to the cooling air.

9. The brushless cooling fan assembly as described in claim 8, wherein the blades of the impeller have an airfoil design, the airfoil design creating a high static pressure that facilitates air flow through the heat sink of the electronic controller module.

10. The brushless cooling fan assembly as described in claim 9, wherein the BLDC motor has a centrifugal fan and a plurality of skewed magnets inside the periphery of the motor that rotates with the impeller to cool the motor while operating.

11. The brushless cooling fan assembly as described in claim 10, wherein the hub of shroud has a plurality of ducts to allow air to be pulled into the motor by the centrifugal fan to cool the motor during operation.

12. The brushless cooling fan assembly as described in claim 11, wherein the BLDC motor is an external rotor BLDC motor, having a rotor on the periphery of the motor to transfer and dissipate heat away from the motor.

13. A brushless cooling fan assembly for aftermarket customization of a vehicle cooling system, comprising:
- an axial fan impeller, the impeller having a center ring, an outer rim and a plurality of blades extending radially from the center ring to the outer rim;
- a shroud for mounting the fan assembly in the vehicle cooling system, the shroud having a center hub with a hollow core and an outer wall, the outer wall having a base plate mounted outside the outer wall;
- a external rotor brushless direct current (BLDC) motor with a center bore and a periphery, the periphery fused to the center ring of the impeller, the hollow core of the shroud inserted through the center bore of the motor, joining together the motor, the shroud and the impeller, the BLDC motor powering the impeller, creating heat; and
- an electronic controller module, having a housing, the housing having an electronic controller electrically connected to the BLDC motor, for controlling the BLDC motor, the module having a heat sink disposed on the housing, the heat sink having a plurality of fins with a sawtooth surface, the heat sink mated to the electronic controller to dissipate the heat away from the electronic controller, the module further having a clip extending substantially above and over the fins of the heat sink, holding the heat sink on the housing and forming a plurality of ducts with the sawtooth surface of the fins, the electronic controller module mounted on the base plate on the outer wall to separate the controller from the BLDC motor, for protecting the electronic controller from heat created by the BLDC motor.

14. The brushless cooling fan assembly as described in claim 13, wherein the outer wall of the shroud has a sidewall orthogonal to and extending outwardly from the base plate, the side wall having an air duct, the side wall having an air duct, the shroud outer wall having an exit opening connected to the air duct, allowing cooling air to stream over the heat sink through the plurality of ducts into the air duct of the side wall and exiting out the opening in the shroud, transferring heat from the heat sink to the cooling air.

15. The brushless cooling fan assembly as described in claim 14, wherein the BLDC motor has a centrifugal fan and a plurality of skewed magnets inside the periphery of the motor that rotates with the impeller to cool the motor while operating.

16. The brushless cooling fan assembly as described in claim 15, wherein the hub of shroud has a plurality of ducts to allow air to be pulled into the motor by the centrifugal fan and the plurality of skewed magnets to cool the motor during operation.

* * * * *